July 31, 1951 A. A. CONCEPCION 2,562,774
METHOD FOR THE MANUFACTURE OF BASKETS AND THE LIKE
Filed June 13, 1949 3 Sheets-Sheet 1
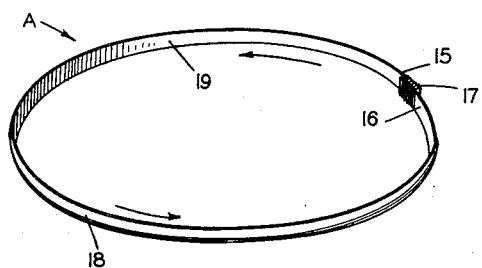
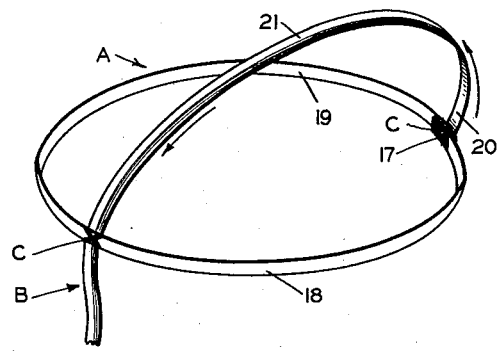
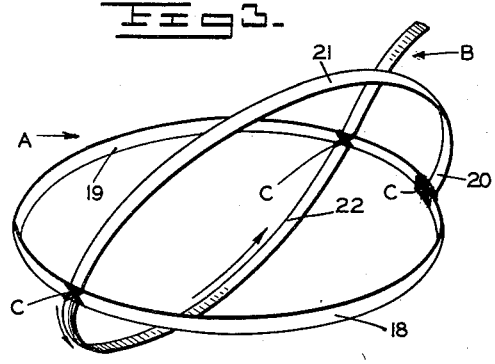
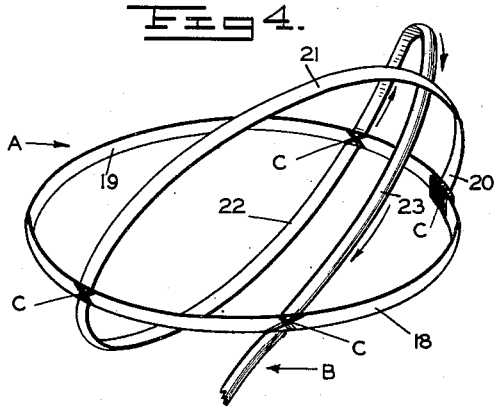
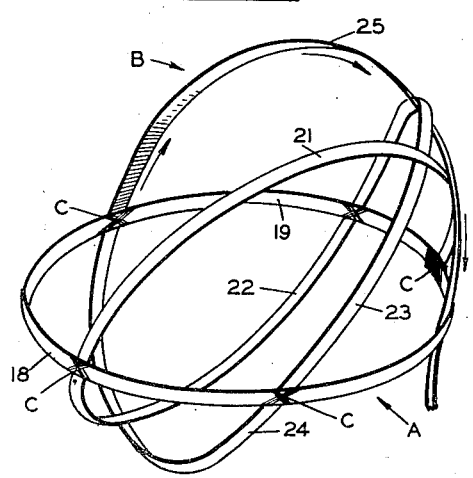
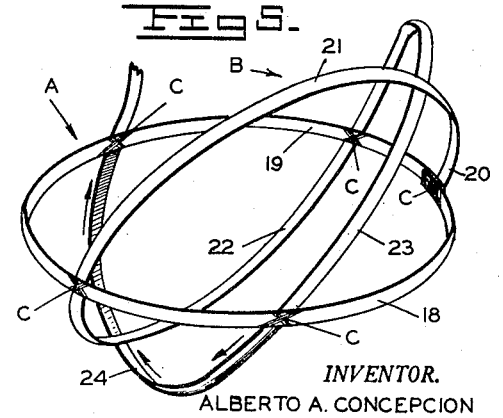
INVENTOR.
ALBERTO A. CONCEPCION

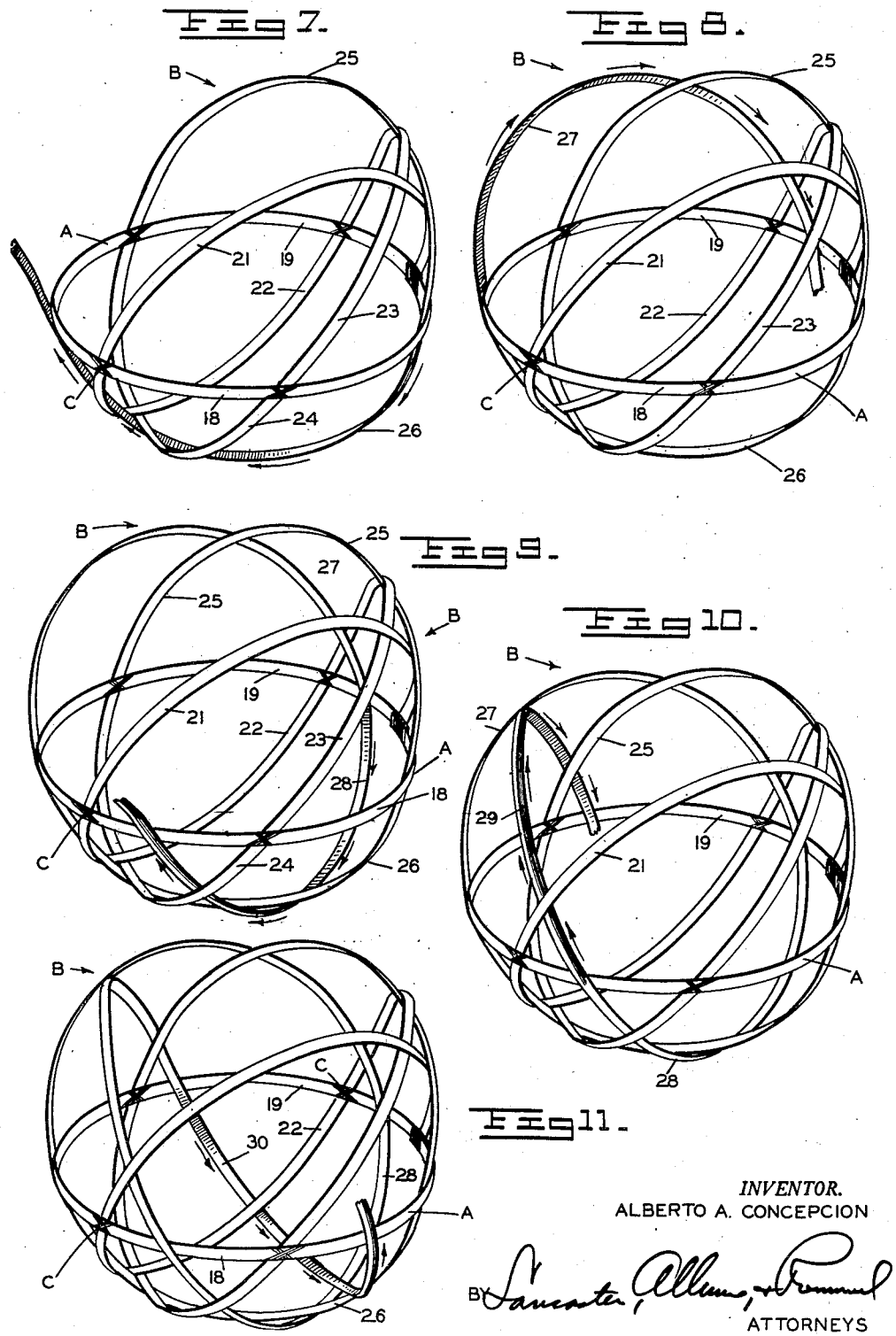

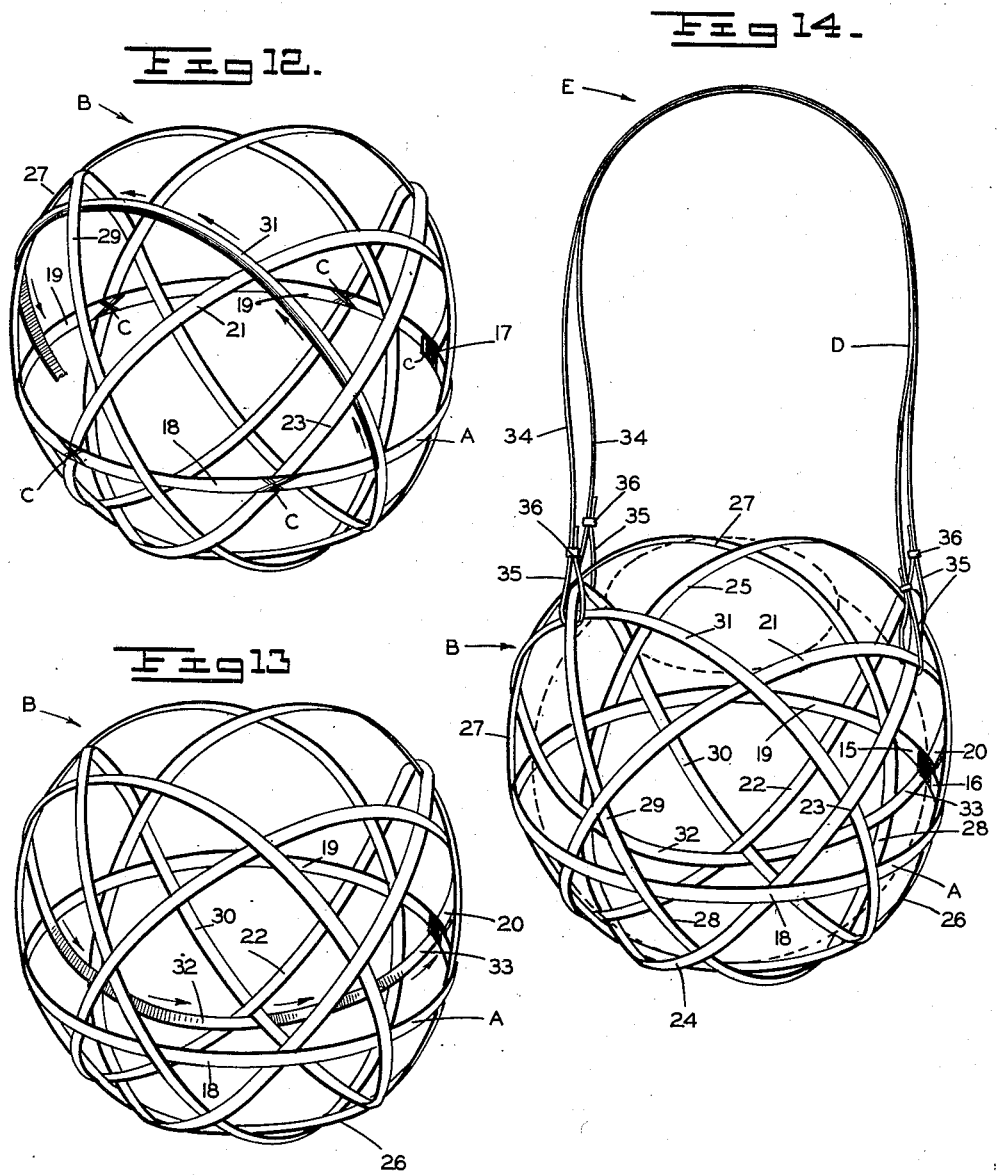

Patented July 31, 1951

2,562,774

UNITED STATES PATENT OFFICE 2,562,774

METHOD FOR THE MANUFACTURE OF BASKETS AND THE LIKE

Alberto A. Concepcion, Detroit, Mich.

Application June 13, 1949, Serial No. 98,692

8 Claims. (Cl. 147—48)

This invention relates to the manufacture of baskets and the like, and more particularly to a method of forming an openwork basket from a hoop of suitable material and, preferably, a continuous length of suitable material. One example of such a basket is to cradle and support a container, as a substantially globular or oblate spheroidal glass vase. If desired, suitable suspension means may be provided in order to form a hanging basket.

An important object of the invention is to provide a method of forming an openwork basket of somewhat globular or ablate spheroidal shape so as to cradle and support a container, also of somewhat like shape.

Another important object is to provide a method as described by which the container is prevented from being removed or dropped from the basket.

Still another important object is to provide a method of forming a wicker-like basket about a frangible container, as a so-called globe, or glass or the like, in such a way that the outer surface of the container may be seen between the wicker-like material and the latter will tend to protect the container against breakage.

A further important object is to provide a method of forming a basket with an upwardly-opening mouth smaller in circumference than the greatest circumference of the basket, so that an article or articles contained in the basket will not be apt to drop therefrom even if the basket is tilted or jarred.

It is also an important object to provide a particularly light weight openwork basket formed by a method employing a hoop or hoop-like portion and a length of suitable flexible material formed into a plurality of crossing portions which cross one another and also cross the hoop.

Other objects and advantages of the invention will be apparent during the course of the following detailed description of the invention, taken in connection with the accompanying drawings, forming a part of this disclosure, and in which drawings:

Figure 1 is a perspective view of a hoop-like portion of the basket.

Figures 2 to 13 inclusive are perspective views, illustrating successive steps in the method of forming the basket.

Figure 14 is a perspective view of the completed basket.

In the drawings, wherein for the purpose of illustration is shown the preferred step-by-step method, and wherein similar reference characters designate corresponding parts throughout the several views the hoop or hoop-like portion is designated as A, the length of flexible material forming the other body sections of the basket as B, means C for retaining parts of the length of flexible material B in place, and D suspension means for the basket, which basket is designated generally as E.

The first step in the method comprises the provision of the hoop A which is preferably formed of a single length of material which may or may not be flexible and like the length of material B. Preferably, the hoop A is formed of a thin strip of bamboo with the end sections 15 and 16 drawn together, overlapped and secured by suitable means 17, as thread, cord, wire or glue with the thread, cord or wire wound about the end sections and the thread or cord tied or the end of the wire wound together, as is well known in the art. The hoop A has an outer face 18 and inner face 19, and is generally disposed in a substantially horizontal position for carrying out the steps of the method. However, the portion A may be a hoop of suitable hardened plastic material having the faces 18 and 19. If the hoop girdles a container to be disposed within the basket to be formed about the container, the inner circumference of the hoop should be somewhat greater than the outer circumference of the container at the desired location of the hoop A. For example, if the container is an oblate spheroid with a greatest outer circumference of four-and-one-half inches, the inner circumference of the hoop A may be five inches and encircle the spheroidal container below but adjacent its equator.

With the hoop A at hand, one end portion 20 of the length of flexible material B is temporarily secured as by means C which may be a length of thread wound around the end portion 20 and, preferably, the overlapped end sections 15 and 16, and tied. The means 17, if of thread, cord or wire, will tend to prevent the temporary means C from slipping if the thread of the latter overlaps the means 17.

The operator now carries the length of material B upwardly and then downwardly across the space within the hoop portion A to form an arcuate section 21, inclined from the vertical, which terminates at the hoop A at a location which may be substantially 144° from the means C. The material B contacts the inner face 19 and may be temporarily secured to the hoop A as by another means C. The parts are now associated as in Figure 2.

In order to form the next section 22, as illustrated in Figure 3, the operator carries the material B downwardly and then upwardly beneath the space within the hoop portion A so that the section 22 is inclined with respect to the horizontal plane of the hoop A, and the material B contacts the outer face 18 where it is secured by a third means C. This point of contact may be substantially 72° from the first means C.

The next section 23 is formed, as in Figure 4 by the operator carrying the material B upwardly and beneath the section 21, then downwardly across the space within the hoop A to contact the inner face 19 at a location which may be substantially 72° from the first means C, where the crossing materials are then preferably temporarily secured as by a fourth means C.

As may be seen in Figure 5, the next section 24 is formed by the operator carrying the material B downwardly and beneath the section 22, then upwardly to contact the outer face 18 of the hoop A at a location which is spaced from the other locations mentioned and may be substantially 216° from the first means C, where the crossing materials are then preferably temporarily secured together as by another means C.

From the last location the length B is carried, as shown in Figure 6, upwardly then downwardly and under the section 23 to provide the section 25, and contacts the inner face 18 intermediate the points where the sections 21 and 23 contact the hoop A. It need not be secured thereto.

Figure 7 illustrates the formation of the section 26 which passes under section 23 and over section 21 to extend over the outer face 18 of the loop A.

In Figure 8, there is shown the formation of the section 27 which passes under section 23 and along the face 19, while, in Figure 9 the section 28 is shown formed and passing beneath section 26, over section 24 and over face 18.

Figure 10 illustrates the formation of section 29 which extends under sections 21 and 27, over section 25 and along the face 19 and Figure 11 shows the formation of section 30 which extends under (or outwardly of) section 22 and over sections 26 and 28 and over face 18.

In Figure 12, section 31 is shown as extending under section 23 over section 21, under section, over section, and over face 19, while, in Figure 13 section 32 extends above section, under section 30 and its end portion 33 joins the other end portion 20, and these end portions are secured together as by any suitable means, as a means C, which is held in place as described in connection with the first means C.

The other means C may be removed so that the basket body will appear substantially as in Figure 13, and the supporting means D, while may be two lengths 34 of material, such as the material of the hoop A and/or length B, turned over at their lower ends to form loops 35 with the end portions of the material secured by means 36 as of thread, cord or the like. It will be noted, in Figure 14, that the crossing of the sections as provided by this method permits each loop 35 to encircle two crossing sections, such as the sections 29 and 31, and sections 21 and 23.

In Figure 14 there is shown, in dotted lines, a conventional so-called globe girdled by the basket material and retained in place thereby. Such a container is adapted to be upstanding and has an upwardly-opening mouth.

From the foregoing, it is clear that the basket may be formed with a minimum of steps, none being complicated, and but a small amount of basket material is required.

Various changes may be made to the steps of the method without departing from the spirit of the invention and scope of the claims.

What is claimed is:

1. The steps in the method of forming a basket which comprise: (1) forming a substantially horizontally-disposed hoop; (2) securing one end portion of a length of flexible material to said hoop at a location thereon; (3) carrying said length from said location upwardly and then downwardly, diagonally with respect to the horizontal plane of said hoop, whereby a basket section is formed; (4) securing said length to said hoop at a location spaced from said first location; (5) carrying said length downwardly and then upwardly, diagonally with respect to said plane, whereby another basket section is formed; (6) securing said length to said hoop at a location spaced from the other locations; (7) carrying said length upwardly and then downwardly, diagonally with respect to said plane, whereby another basket section is formed; and repeating in turn steps 6, 5, 6 and 7 until the desired number of sections is formed, during each alternate carrying step said length being carried across the inside face of said hoop and during each other carrying step said length being carried across the outside face of said hoop.

2. The steps in the method of forming a basket which comprise: (1) forming a substantially horizontally-disposed hoop; (2) securing one end portion of a length of flexible material to said hoop at a location thereon; (3) carrying said length from said location upwardly and then downwardly, diagonally with respect to the horizontal plane of said hoop, whereby a basket section is formed; (4) securing said length to said hoop at a location spaced from said first location; (5) carrying said length downwardly and then upwardly, diagonally with respect to said plane, whereby another basket section is formed; (6) securing said length to said hoop at a location spaced from the other locations; (7) carrying said length upwardly and then downwardly, diagonally with respect to said plane, whereby another basket section is formed; repeating in turn steps 6, 5, 6 and 7 until the desired number of sections is formed, during each alternate carrying step said length being carried across the inside face of said hoop and during each other carrying step said length being carried across the outside face of said hoop; and disconnecting said length from said hoop at at least some of said locations.

3. The steps in the method of forming a basket which comprise: (1) forming a substantially horizontally-disposed hoop; (2) securing one end portion of a length of flexible material to said hoop at a location thereon; (3) carrying said length from said location upwardly and then downwardly, diagonally with respect to the horizontal plane of said hoop, whereby a basket section is formed; (4) securing said length to said hoop at a location spaced from said first location; (5) carrying said length downwardly and then upwardly, diagonally with respect to said plane, whereby another basket section is formed; (6) securing said length to said hoop at a location spaced from the other locations; (7) carrying said length upwardly and then downwardly, diagonally with respect to said plane, whereby another basket section is formed; repeating, in turn, steps 6, 5, 6 and 7 until the desired number of sections is formed, during each alternate carrying step said length being carried across the inside face of said hoop and during each other carrying step said length being carried across the outside face of said hoop; disconnecting such length from said hoop at at least some of said locations, including said first location; and securing together the two end portions of said length.

4. The steps in the method of forming a basket which comprise: (1) forming a substantially horizontally-disposed hoop; (2) securing one end portion of a length of flexible material to said hoop at a location thereon; (3) carrying said length from said location upwardly and then downwardly, diagonally with respect to the horizontal plane of said hoop, whereby a basket section is formed; (4) securing said length to said hoop at a location spaced from said first location; (5) carrying said length downwardly and then upwardly, diagonally with respect to said plane, whereby another basket section is formed; (6) securing said length to said hoop at a location spaced from the other locations; (7) carrying said length upwardly and then downwardly, diagonally with respect to said plane, whereby another basket section is formed; repeating, in turn, steps 6, 5, 6 and 7 until the desired number of sections is formed, during each alternate carrying step said length being carried across the inside face of said hoop and during each other carrying step said length being carried across the outside face of said hoop; and disconnecting said length from said hoop at said locations.

5. The steps in the method of forming a basket about an upstanding container having an upwardly opening mouth, which comprise: (1) forming a substantially horizontally-disposed hoop; (2) girdling said container with said hoop; (3) securing one end portion of a length of flexible material to said hoop at a location on said hoop; (4) carrying said length from said location upwardly and then downwardly over a portion of said container and clear of said mouth whereby a basket section is formed; (5) securing said length to said hoop at a location spaced from said first location; (6) carrying said length downwardly and then upwardly over a portion of said container, whereby another basket section is formed; (7) securing said length to said hoop at a location spaced from said other locations; (8) carrying said length upwardly and then downwardly over a portion of said container and clear of said mouth, whereby another basket section is formed; and repeating, in turn, steps 7, 6, 7, 8 until the desired number of basket sections is formed, during each alternate carrying step said length being carried across the inside face of said hoop and during each other carrying step said length being carried across the outside face of said hoop.

6. The steps in the method of forming a basket about an upstanding container having an upwardly opening mouth, which comprise: (1) forming a substantially horizontally-disposed hoop; (2) girdling said container with said hoop; (3) securing one end portion of a length of flexible material to said hoop at a location on said hoop; (4) carrying said length from said location upwardly and then downwardly over a portion of said container and clear of said mouth whereby a basket section is formed; (5) securing said length to said hoop at location spaced from said first location; (6) carrying said length downwardly and then upwardly over a portion of said container, whereby another basket section is formed; (7) securing said length to said hoop at a location spaced from said other locations; (8) carrying said length upwardly and then downwardly over a portion of said container and clear of said mouth, whereby another basket section is formed, during each alternate carrying step said length being carried across the inside face of said hoop and during each other carrying step said length being carried across the outside face of said hoop; repeating, in turn, steps 7, 6, 7, 8 until the desired number of basket sections is formed; and disconnecting said length from said hoop at at least some of said locations.

7. The steps in the method of forming a basket about an upstanding container having an upwardly opening mouth, which comprise: (1) forming a substantially horizontally-disposed hoop; (2) girdling said container with said hoop; (3) securing one end portion of a length of flexible material to said hoop at a location on said hoop; (4) carrying said length from said location upwardly and then downwardly over a portion of said container and clear of said mouth whereby a basket section is formed; (5) securing said length to said hoop at a location spaced from said first location; (6) carrying said length downwardly and then upwardly over a portion of said container, whereby another basket section is formed; (7) securing said length to said hoop at a location spaced from said other locations; (8) carrying said length upwardly and then downwardly over a portion of said container and clear of said mouth, whereby another basket section is formed; repeating, in turn, steps 7, 6, 7, 8 until the desired number of basket sections is formed, during each alternate carrying step said length being carried across the inside face of said hoop and during each other carrying step said length being carried across the outside face of said hoop; disconnecting said length from said hoop at at least some of said locations, including said first location; and securing together the two end portions of said length.

8. The steps in the method of forming a basket which comprise: (1) forming a substantially horizontally-disposed hoop; (2) securing one end portion of a length of flexible material to said hoop at a location thereon; (3) carrying said length from said location upwardly and then downwardly, diagonally with respect to the horizontal plane of said hoop, whereby a basket section is formed; (4) securing said length to said hoop at a location spaced from said first location; (5) carrying said length downwardly and then upwardly, diagonally with respect to said plane, whereby another basket section is formed; (6) securing said length to said hoop at a location spaced from the other locations; (7) carrying said length upwardly and then downwardly, diagonally with respect to said plane, whereby another basket section is formed; (8) repeating step 6; (9) carrying said length downwardly and then upwardly, diagonally with respect to said plane and in crossing contact with one of said sections, whereby another section is formed; (10) repeating step 6; (11) carrying said length upwardly and then downwardly, diagonally with respect to said plane and in crossing contact with one of said sections; repeating steps 9 and 11 until the desired number of sections is formed, during each alternate carrying step said length being carried across the inside face of said hoop and during each other carrying step said length being carried across the outside face of said hoop; and securing the free end portion of said length to said basket.

ALBERTO A. CONCEPCION.

REFERENCES CITED

The following references are of record in the file of this patent:

UNITED STATES PATENTS

| Number | Name | Date |
| --- | --- | --- |
| 1,088,835 | Melzer | Mar. 3, 1914 |